March 2, 1948. W. A. HYLAND 2,437,094
GEAR SHIFTING MECHANISM FOR GRAIN DRILLS OR THE LIKE
Filed Dec. 22, 1945

FIG. I

INVENTOR.
WILLIAM A. HYLAND
ATTORNEYS.

Patented Mar. 2, 1948

2,437,094

UNITED STATES PATENT OFFICE 2,437,094

GEAR SHIFTING MECHANISM FOR GRAIN DRILLS OR THE LIKE

William A. Hyland, Horicon, Wis., assignor to John Deere Van Brunt Company, a corporation of Wisconsin Application December 22, 1945, Serial No. 636,840

3 Claims. (Cl. 74—342)

The present invention relates generally to agricultural machines and more particularly to grain drills and the like.

The object and general nature of the present invention is the provision of a new and improved mechanism for changing the rate of drive of the fertilizer distributing mechanism of a grain drill, and more particularly the agitator drive shaft of a fertilizer grain drill. More specifically, it is an important feature of this invention to provide a simple and inexpensive means for shifting a compound gear member on the jackshaft of the fertilizer drive from one position to another and additionally holding the same in either of its selected positions. Particularly, it is a feature of this invention to provide a spring member mounted on the shiftable gear member and having a stud or the like engageable in either one or the other of a pair of openings or recesses formed on the driving jackshaft, the spring member having a finger hold which provides not only for engaging and disengaging the retaining stud from the shaft but also has a means for conveniently shifting the gear member from one position to another.

These and other objects and advantages of the present invention will be apparent to those skilled in the art after a consideration of the following detailed description, taken in conjunction with the accompanying drawings, in which:

Figure 1 is a perspective view of the fertilizer section of a grain drill; and

Figure 2:
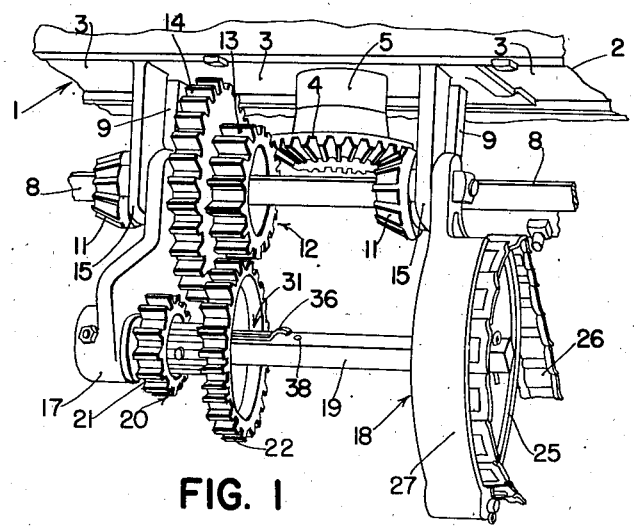
Figures 2 and 3 are views showing the different positions of the shiftable gear member.

Referring now to the drawings, the seed box of a grain drill in which the principles of the present invention have been incorporated is indicated by the reference numeral 1 and preferably includes a compartment 2 adapted to contain fertilizer which is adapted to be discharged therefrom through fertilizer spouts (not shown) which are fastened to fertilizer bottom plates 3. The fertilizer in the compartment 2 is kept in a free flowing condition by a plurality of agitators mounted for rotation in the compartment 2, each being fixed to the upper end of a shaft, the lower end of which receives a bevel gear 4 and is journaled for rotation in a journal section 5 formed on or carried by each of the bottom plates 3. The several gears 4, only one of which is shown in Figure 1, are driven simultaneously by a fertilizer drive shaft 8 that is mounted for rotation in brackets 9 formed on the bottom plates 3 and which carries a plurality of driving pinions 11, one for each of the agitator drive gears 4. The shaft 8 is driven by a compound gear member 12 having a small gear section 13 and a large gear section 14.

The shaft-supporting bars 9 are extended, as at 15, and receive a pair of hangers 17 and 18 in which a jackshaft 19 is supported for rotation. The jackshaft 19 is preferably square and carries a slidable gear member 20 thereon. The gear member 20 is also a compound gear, having a smaller section 21 and a larger gear section 22. The sections 21 and 22 are, however, spaced apart farther than the sections 13 and 14 of the gear member 12, so that only one of the sections 21 and 22 can be meshed with the other gear sections 13 and 14 at any one time. A sprocket gear 25 is fixed to the outer end of the jackshaft 19, and receives a sprocket chain 26 which is driven in any suitable manner, as by a sprocket on the axle of the grain drill. The hanger 18 is provided with a section 27 which serves as a shield for the sprocket 25 and chain 26.

Figure 3:
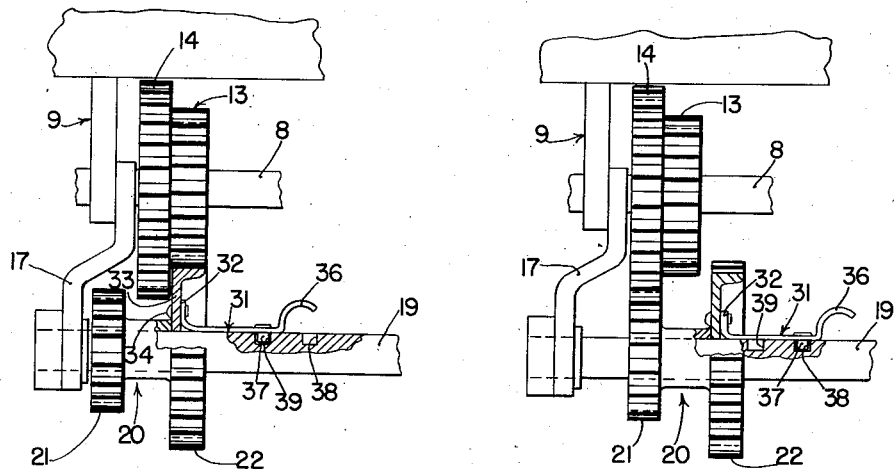

As best shown in Figures 2 and 3, the shiftable gear 20 is held in either of its two optional positions by a spring member 31 having an end 32 secured to the web 33 of the gear section 22 by a rivet 34 or other suitable means. The spring member 31 at its outer end is formed with hooklike section 36 forming a finger hold, and a stud 37 is carried by the spring member 31 adjacent its outer end. The jackshaft 19 is provided with a pair of openings 38 and 39 spaced so that when the stud 37 is disposed in the opening 39, as shown in Figure 2, the gear section 22 meshes with the gear section 13, and when the stud 37 is disposed in the opening 38, as shown in Figure 3, the gear section 21 meshes with the gear section 14.

When it is desired to drive the fertilizer agitator shaft 8 at a relatively slow speed, the finger hold section 36 of the spring 31 is grasped and lifted out of the position shown in Figure 2, which is the position for high speed drive, and, utilizing the spring 31, the gear member 20 is shifted over into the position shown in Figure 3, and when the gear sections 14 and 21 are in proper mesh the spring section 36 is released and the stud 37 permitted to enter the opening 38 in the shaft 19. This not only positions the gear 20 in the proper place but, additionally, serves to retain the gear 20 in this position until it is desired to change back to a high speed drive, which is readily done by grasping the spring end 36, disengaging the stud 37 from the opening 38, using the spring 31 to shift the gear member 20 back to the position shown in Figure 2 and then releasing the spring 31 to permit the stud 37 to lie in the opening 39 (Figure 2).

While I have shown and described above the preferred structure in which the principles of the present invention have been incorporated, it is to be understood that my invention is not to be limited to the particular details shown and described above, but that, in fact, widely different means may be employed in the broader aspects of my invention.

What I claim, therefore, and desire to secure by Letters Patent is:

1. In a grain drill, a shaft, a gear member slidable thereon, said shaft having a pair of axially spaced recesses therein, and gear shifting and holding means comprising a flat spring member adapted to extend for the major portion of its length along said shaft and having at one end a radially outwardly turned portion and means securing said outwardly turned portion to said gear, the opposite end portion of said spring member having a lug thereon engageable in either one or the other of said recesses in the shaft, depending upon the position of said gear thereon, and said spring member having outwardly of said stud an integral radially outwardly curved generally hook shaped section serving as a finger hold by which said spring member may be swung outwardly to disengage the stud from the recess and when the lug is so disengaged said finger hold may be used to shift said gear into another position on said shaft.

2. In a grain drill or the like having a shaft with a pair of axially spaced recesses therein, a shiftable gear member adapted for shiftable mounting on said shaft, and a spring holding and gear shifting member comprising a flat spring member fixed at one end to the radially inner portion of said gear adjacent said shaft and having a portion adapted to extend axially outwardly away from said gear and along said shaft, said spring member having at its outer end a recess-engaging stud spaced axially outwardly of said gear and axially outwardly of said stud a finger hold section which may be grasped for disengaging the stud from the recess and shifting said gear along said shaft.

3. In a grain drill or the like having a polygonal shaft with a pair of axially spaced recesses formed in one of the flat sides of said shaft, a shiftable gear member adapted for shiftable mounting on said polygonal shaft, and a spring holding and gear shifting member comprising a flat spring member fixed at one end to said gear and having a portion adapted to extend along and in substantial contact with said one flat side of said shaft, said spring member having at its outer end a recess-engaging stud fixedly secured thereto, whereby said spring acts through said stud to hold said gear member against axial movement along said shaft, said spring member having outwardly of said stud a generally semi-circular finger-embracing section adapted to be engaged with one finger for, first, disengaging the stud from one of said recesses and, second, shifting said gear along said shaft.

WILLIAM A. HYLAND.

REFERENCES CITED

The following references are of record in the file of this patent:

UNITED STATES PATENTS

| Number | Name | Date |
| --- | --- | --- |
| 858,651 | Griffith | July 2, 1907 |
| 1,059,434 | Butler | Apr. 22, 1913 |